United States Patent [19]

Franzman et al.

[11] Patent Number: 5,342,897

[45] Date of Patent: Aug. 30, 1994

[54] AQUEOUS POLYMER DISPERSIONS AND POLYMER POWDERS PREPARED THEREFROM BY SPRAY DRYING

[75] Inventors: Gernot Franzman, Bobenheim; Folf Petri, Pierstrasse; Walter Pitteroff, Bobenheim, all of Fed. Rep. of Germany

[73] Assignee: BASF Aktiengesellschaft, Ludwigshafen, Fed. Rep. of Germany

[21] Appl. No.: 34,215

[22] Filed: Mar. 19, 1993

Related U.S. Application Data

[62] Division of Ser. No. 725,605, Jul. 3, 1991, abandoned.

[30] Foreign Application Priority Data

Jul. 3, 1990 [DE] Fed. Rep. of Germany ....... 4021216

[51] Int. Cl.$^5$ ............................................. C08L 33/04
[52] U.S. Cl. .................................... 525/221; 525/227; 525/230; 525/198; 525/218
[58] Field of Search ................... 524/5, 460, 458, 558; 525/221, 218, 227, 198, 230

[56] References Cited

U.S. PATENT DOCUMENTS

| | | | |
|---|---|---|---|
| 3,100,156 | 8/1963 | Kalousek et al. | |
| 3,896,073 | 7/1988 | Smith | 524/535 |
| 4,022,737 | 5/1977 | Sekmakas et al. | |
| 4,386,172 | 5/1983 | Yoshioka et al. | 523/408 |
| 4,501,845 | 2/1985 | Baus et al. | 524/460 |
| 4,532,295 | 7/1985 | Brabetz et al. | 526/208 |
| 4,892,910 | 1/1990 | Klesse et al. | 523/342 |
| 4,892,932 | 1/1990 | Rauch et al. | 528/499 |

OTHER PUBLICATIONS

Chemical Abstracts, vol. 105, No. 4, Jul. 1986, pp. 302, 28869A, & JP-A-6-103, 745, Jun. 19, 1984.

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Aqueous polymer dispersions containing,

I as the disperse phase, a film-forming dispersion polymer and

II in the aqueous phase, from 5 to 40% by weight, based on the total dry mass of I and II, of a completely or partially neutralized water-soluble copolymer of
  a) from 50 to 80 mol % of an olefinically unsaturated mono- or dicarboxylic acid, of an anhydride of these acids or of a mixture of these monomers,
  b) from 20 to 50 mol % of a $C_3$-$C_{12}$-alkene, of styrene or of a mixture of these monomers and
  c) from 0 to 10 mol % of further monomers which can be subjected to free radical polymerization, and the powders obtained by spray-drying these polymer dispersions are suitable as binders for water-resistant plastics renders and coatings and as adhesives or adhesive components.

4 Claims, No Drawings

AQUEOUS POLYMER DISPERSIONS AND POLYMER POWDERS PREPARED THEREFROM BY SPRAY DRYING

This application is a division of application Ser. No. 07/725,605, filed on Jul. 3, 1991, now abandoned.

The present invention relates to aqueous polymer dispersions containing,

I as the disperse phase, a film-forming dispersion polymer and

II in the aqueous phase, from 5 to 40% by weight, based on the total dry mass of I and II, of a completely or partially neutralized water-soluble copolymer of
  a) from 50 to 80 mol % of an olefinically unsaturated mono- or dicarboxylic acid, or an anhydride of these acids or of a mixture of these monomers,
  b) from 20 to 50 mol % of a $C_3$-$C_{12}$-alkene, or styrene or a mixture of these monomers and
  c) from 0 to 10 mol % of further monomers which can be subjected to free radical polymerization.

The present invention furthermore relates to the redispersible polymer powders obtained by spray drying these polymer dispersions, and to the use of the polymer dispersions or of the polymer powders redispersed in water as adhesives or as binders for water-resistant plastics renders and coating materials.

Aqueous polymer dispersions and polymer powders thereof obtained by spray drying and their use for the production of contact adhesive coatings and as additives for hydraulic binders are generally known. The additives improve the compressive strength, flexural strength and tensile strength of the building materials to which they are added.

Because of the storage and transport costs, the additives are preferably used in the form of their redispersible polymer powders, especially in the form of dry formulations containing the usual coating and render components. Such dry formulations are stirred with water shortly before they are used.

The glass transition temperature of the dispersion polymers contained in the aqueous dispersion is usually below 50° C., which leads to difficulties in spray drying because the powder tends to form lumps.

This deficiency can be remedied by the concomitant use of spray assistants, for example finely divided silica, but the powders prepared in this manner are less readily redispersible and furthermore can be stored for only a limited time.

It is an object of the present invention to provide novel aqueous polymer dispersions which, when used directly as binders for coating materials and renders, impart water-resistance to the said coating materials and renders, and give polymer powders which have a long shelf life and are readily redispersible in water.

We have found that this object is achieved by the polymer dispersions defined at the outset.

We have also found polymer powders which are readily redispersible in water, have a long shelf life and are obtainable by spray drying the polymer dispersions, and the use of the polymer dispersions or their polymer powders prepared by spray drying as contact adhesives and as additives for hydraulic binders and coating materials.

Component I may in principle consist of any film-forming homo- or copolymer. Dispersion polymers of this type are known or are obtainable in a known manner. Other details in this context are given in DE-A 22 38 903, 3 143 070 and 3 143 071.

In the case of the homopolymers, component I consists, for example, of butadiene, styrene, vinyl chloride, vinylidene chloride, a $C_4$-$C_8$-alkyl acrylate or methacrylate or a vinyl ester of a $C_2$-$C_{12}$-carboxylic acid, such as acetic acid, propionic acid or lauric acid.

Suitable further monomers are the other monomers already stated and the following monomers:
  acrylonitrile and methacrylonitrile,
  unsaturated $C_3$-$C_6$-mono- or dicarboxylic acids and itaconic acid,
  maleic anhydride and itaconic anhydride and
  the amides, N-methylolamides and N-($C_1$-$C_4$-alkyl)-amides of the abovementioned acids, in particular of acrylic acid and methacrylic acid.

However, preferred copolymers are those consisting of
  from 20 to 80% by weight of one or more of the abovementioned acrylates and methacrylates, from 20 to 80% by weight of styrene and from 0 to 40% by weight of further monomers;
  from 5 to 40% by weight of one or more of the abovementioned acrylates and methacrylates, from 60 to 95% by weight of one or more of the abovementioned vinyl esters and from 0 to 30% by weight of further monomers;
  from 40 to 80% by weight of one or more of the abovementioned vinyl esters, from 20 to 60% by weight of vinyl chloride and from 0 to 10% by weight of further monomers;
  from 50 to 95% by weight of one or more of the abovementioned vinyl esters, from 5 to 15% by weight of ethylene, from 0 to 40% by weight of vinyl chloride and from 0 to 40% by weight of further monomers;
  from 30 to 70% by weight of butadiene, from 70 to 30% by weight of styrene, from 0 to 30% by weight of one or more of the abovementioned acrylates or methacrylates and from 0 to 30% by weight of further monomers.

The dispersion polymer I should preferably have a glass transition temperature of from ($-60°$) to 50° C., in particular from ($-60°$) to 25° C. The skilled worker can fulfil this condition in a conventional manner through the choice of the monomers and of their proportions by weight.

Preferred comonomers a) of component II are the abovementioned acids and their anhydrides, including in particular acrylic acid, methacrylic acid and itaconic acid and maleic anhydride.

Suitable comonomers b) of component II are in particular propene, butene, isobutene and diisobutene, in addition to styrene.

Examples of suitable further comonomers c) of component II are all those stated as monomers for component I of the dispersion polymer, provided that they are not covered by the definition of II a) or II b).

The molar ratios of the comonomers in the copolymer of the component II are 50–80 mol % of component II a) and 20–50 mol % of component II b), in particular 50 mol % of II a) and b).

Component II is advantageously prepared in a conventional manner by solution or mass polymerization and subsequent complete or partial neutralization of the polymer.

Preferred bases for the neutralization are sodium hydroxide solution and basic sodium compounds, such as sodium carbonate and sodium acetate, as well as ammonia.

The amount of II is from 5 to 40, preferably from 20 to 30, % by weight, based on the total dry mass of I and II in the novel polymer dispersion.

The novel polymer dispersions can be prepared, for example, by a procedure in which the dispersion I and the solution II are prepared in a conventional manner separately from one another and the two components are then mixed. All polymerizations can be carried out in a conventional manner, for example using azoisobutyronitrile or dibenzoyl peroxide as free radical initiators and, where the polymers are dispersion polymers, using conventional emulsifiers in the usual amounts. Suitable emulsifiers include lauryl sulfate, sodium n-dodecylsulfonate, sodium n-tetradecylsulfonate and sodium n-dodecylbenzenesulfonate and in particular ethoxylated alcohols or phenols.

The novel polymer dispersions may furthermore contain conventional additives, such as protective colloids, for example polyvinyl alcohol or polyvinylpyrrolidone, and may also contain antiblocking agents, such as finely divided silica in the conventional amounts.

Spraying of the aqueous polymer dispersions consisting of components I and II can be carried out in a conventional manner in a spray dryer using a single-material or multi-material nozzle or a rotating-disk atomizer at from 100° to 200° C. Component II prevents undesirable film formation on the particles.

The dry polymer powders are separated off in a conventional manner, in particular using cyclones or filter separators.

The polymer powders obtained are readily redispersible in water and can be stored without problems at room temperature.

The novel aqueous polymer dispersions or their polymer powders which have been redispersed in water are good adhesives for plastics, wood and paper as well as for mineral building materials, such as concrete and bricks.

The novel polymer dispersions are particularly suitable as binders for water-resistant coatings and renders which contain mineral building materials, because the cations present in these substances, such as calcium and/or aluminum cations, react with the acid anions of component II to give insoluble compounds.

For the production of such water-resistant renders or coatings, it is also possible to add the salts of polyvalent metal cations, preferably those of magnesium, of calcium and of aluminum.

The dry formulations of the polymer powders and the coating or building materials are of particular importance because they can be more readily stored and transported.

The dry formulations preferably contain from 3 to 10% by weight of the novel polymer powders, based on the total amount of the formulation.

If the aqueous polymer dispersions are used for preparation of render or coating material, their content of polymer is preferably from 10 to 50% by weight.

The formulations may furthermore contain sand, chips for aggregate finish or pigments in the conventional amounts.

Water is added to the dry formulations shortly before use, thorough mixing is effected and the mixture is processed in a conventional manner.

EXAMPLE a) Preparation of a Polymer Dispersion I

A dispersion polymer was prepared in a conventional manner from a mixture of 400 kg of styrene, 600 kg of butyl acrylate and 20 kg of acrylamide in the course of 4 hours at 80° C. The amount of water was 1,000 kg; the free radical initiator used was potassium persulfate and the emulsifier employed was an ethoxylated and partially sulfated phenol having a degree of ethoxylation of 25.

b) Preparation of a Polymer Component II 1,700 kg of molten maleic anhydride which was at 80° C. were added to 1,793 kg of anhydrous diisobutene at 160° C. and at from 2 to 2.5 bar in the course of 4 hours under a nitrogen atmosphere. A mixture of 167 kg of diisobutene and 100 kg of di-tert-butyl peroxide was added simultaneously in the course of 5 hours. During this time, the temperature was kept at 160° C. and the mixture was then postpolymerized for a further hour at this temperature.

Thereafter, the pressure in the reaction kettle was reduced to 0.1 bar, the remainder of unconverted diisobutene distilling off. When reducing the pressure, care was taken to ensure that the temperature of the polymer was always greater than 135° C.

The polymer obtained in this manner was completely neutralized with 2,800 l of 25% strength sodium hydroxide solution in the course of 2 hours, after which 2,500 l of water were added. During the neutralization reaction, the pressure was kept at 4 bar and the temperature at 135° C. Stirring was continued at this temperature for 2 hours.

c) Preparation of a Mixture of I and II 200 kg of solution II (solids content 90 kg) were mixed with 50 kg of dispersion I (solids content 30 kg) at room temperature.

This mixture was directly suitable for the production of mineral-containing renders and coating materials. The renders and coatings obtained therewith proved to be very water-resistant.

d) Preparation of a Polymer Powder 80 kg/h of the polymer dispersion mixture was spray-dried in a commercial spray dryer from IWK with an air throughput of 2,300 m$^3$/h at 120° C. The powder obtained was separated off in a cyclone.

The completely white powder was very readily dispersible in water. The dispersion prepared in this manner had the same excellent performance characteristics as the original dispersion.

e) Dry Formulation for Exterior Coatings

A dry formulation having a long shelf-life was prepared by mixing in a conventional manner
  73 kg of calcium magnesium carbonate (chalk),
  5.0 kg of polymer powder according to stage d),
  3.0 kg of a mixture of 95% by weight of titanium dioxide, 2.5% by weight of alumina and 2.5% by weight of silica as a white pigment,
  2.0 kg of calcium oxide for the formation of sparingly soluble salts,
  2.0 kg of caprolactam as a film-forming assistant,
  2.0 kg of a commercial antifoam powder, 0.3 kg of a pigment disperser consisting of 65% by weight of sodium metaphosphate and 35% by weight of sodium orthophosphate and 0.2 kg of cellulose as a processing assistant.

Directly before use, this formulation was stirred with 15.5 kg of water to give a readily brushable material for exterior coatings. After processing, this material gave a coating having high water-resistance.

We claim:

1. A polymer powder, obtained by spray-drying an aqueous polymer dispersion comprising:
   I) as the disperse phase, a film-forming dispersion polymer having a glass transition temperature less than 50° C., and
   II) in the aqueous phase, from 5 to 40% by weight, based on the total dry mass of I and II, of a completely or partially neutralized water-soluble copolymer of
   a) from 50 to 80 mol % of an olefinically unsaturated mono- or dicarboxylic acid, or an anhydride of these acids or a mixture of these monomers,
   b) from 20 to 50 mol % of a $C_3$-$C_{12}$-alkene, or styrene or a mixture of these monomers; and
   c) from 0 to 10 mol % of further monomers which can be subjected to free radical polymerization, said copolymer II differing from polymer I.

2. A dry formulation for the production of ready-to-use aqueous renders, containing a polymer powder as claimed in claim 1 and lime or cement.

3. A method for the preparation of a formulation containing a dry adhesive which comprises incorporating in the formulation of the polymer powder of claim 1.

4. A dry formulation for the preparation of ready-to-use adhesives containing a polymer powder as claimed in claim 1.

* * * * *

UNITED STATES PATENT AND TRADEMARK OFFICE
CERTIFICATE OF CORRECTION

PATENT NO. : 5,342,897
DATED : August 30, 1994
INVENTOR(S) : Gernot FRANZMANN, et al.

It is certified that error appears in the above-indentified patent and that said Letters Patent is hereby corrected as shown below:

On the Title Page, Item[19], the inventor should read:

--Franzmann et al.--

On the Title Page, Item [75], the inventors should read:

--Gernot Franzmann, Bobenheim; Rolf Petri, Frankenthal; Walter Pitteroff, Bobenheim, all of Fed. Rep. of Germany--

Signed and Sealed this

Twenty-ninth Day of November, 1994

Attest:

BRUCE LEHMAN

*Attesting Officer*  *Commissioner of Patents and Trademarks*